DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 18, 1972

900 O.G. 816

T900,003

METHOD OF IMPROVING RUBBER TO BRASS ADHESION

Robert L. Arnold, Medina, and John P. Vander Kooi, Akron, Ohio, assignors to Monsanto Company, St. Louis, Mo.

Filed Mar. 5, 1971, Ser. No. 121,563
Int. Cl. B32b *15/06;* C08c *9/04, 11/62*
U.S. Cl. 156—306
No Drawing. 15 Pages Specification

The adhesion of rubber to brass is improved by a method which comprises the addition to the rubber of sulpenamide-type prevulcanization inhibitors of the formula

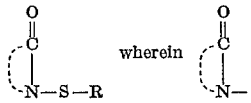

is a radical derived by removal of hydrogen from an imide of a dicarboxylic acid, from a monocarbonyl cyclic urea, and from an imide in which the nitrogen is linked to carbonyl by alkylene and R is alkyl, aryl, or cycloalkyl. The method is applicable to sulfur-vulcanizable rubber stock comprising natural rubber, synthetic cis 1,4-polyisoprene rubber, or rubber blends of about 50% natural rubber or about 50% synthetic cis 1,4-polyisoprene rubber, sulfur as vulcanizing agent and a vulcanization accelerator selected from the group consisting of 2-mercaptobenzothiazole, 2,2′-benzothiazolyldisulfide and 2-benzothiazolesulfenamide of the formula

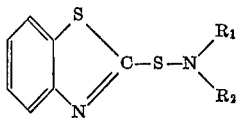

wherein $R_1$ is hydrogen or alkyl of 1–8 carbon atoms, $R_2$ is alkyl of 1–8 carbon atoms or cycloalkyl of 5–8 carbon atoms or $R_1$ and $R_2$ with the nitrogen atom form a heterocycle of 4–8 carbon atoms, wherein the sulfur/accelerator ratio is less than 4 and comprises adding an adhesion enhancing amount of the sulfenamide-type prevulcanization inhibitor to the stock, contacting the stock to brass and vulcanizing the composite.